Jan. 22, 1935.   F. X. LAUTERBUR ET AL   1,988,561
MIXING MACHINE
Filed July 30, 1931   3 Sheets-Sheet 1

INVENTORS
FRANK X. LAUTERBUR
EDWARD J. LAUTERBUR
BY
ATTORNEYS

Jan. 22, 1935.  F. X. LAUTERBUR ET AL  1,988,561

MIXING MACHINE

Filed July 30, 1931   3 Sheets-Sheet 2

INVENTORS
FRANK X. LAUTERBUR
EDWARD J. LAUTERBUR
BY
ATTORNEYS

Jan. 22, 1935.    F. X. LAUTERBUR ET AL    1,988,561
MIXING MACHINE
Filed July 30, 1931    3 Sheets-Sheet 3

INVENTORS
FRANK X. LAUTERBUR
EDWARD J. LAUTERBUR
BY
ATTORNEYS.

Patented Jan. 22, 1935

1,988,561

UNITED STATES PATENT OFFICE 1,988,561

MIXING MACHINE

Frank X. Lauterbur and Edward J. Lauterbur, Sidney, Ohio; Wilhelmina S. Lauterbur and Leo V. Lauterbur, executors of said Frank X. Lauterbur, deceased Application July 30, 1931, Serial No. 553,916

13 Claims. (Cl. 259—109)

Our invention relates to mixing machines, and particularly to such machines as are used in the mixing of baking ingredients such as dough and batter.

In the art there has been considerable development in mixing machines particularly adapted for the mixing of dough without sufficient frictional heat being developed as to cause overheating of the dough batch. In our Patent No. 1,651,092, of November 29, 1927, we have disclosed a mixer in which arcuate agitator arms are mounted in a staggered arrangement on supporting hubs so that the agitator can be operated at high speed while exerting a thorough mixing without tearing the dough. Further, in our Patent No. 1,672,264, of June 5, 1928, we have disclosed a novel mixing process in which the dough mass is so broken and diverted during the mixing operation that a cooling air space is formed at a certain stage of the mixing operation which materially retards overheating of the dough. The improvement in mixing machines, as set forth herein, has as its object refinements in the general art of mixing in which frictional overheating is avoided, and in which the apparatus is adjustable for varying the mixing conditions so that different types of dough may be advantageously prepared.

Another object of our invention is the provision of dough mixing apparatus in which artificial cooling, as by water, brine, or cooling gas, may be accomplished with the cooling area distributed over a wide surface area of the bowl walls. It is our object in the shape of our bowl walls to provide abutments which will direct the movements of the mixed ingredients so that frictional overheating will be avoided.

Another object is to provide a mixing bowl having an abutment to which is attached a baffle which may be adjusted to vary the diverting action on the dough being mixed and which alters the resultant action of the abutment according to its position with relation to the side walls of the mixing bowl.

Another object is to provide an abutment in the surface of the mixing bowl so that cooling mediums can be employed directly in contact with the surface of the abutment and thereby keep the surface contacting with the dough at a relatively low temperature.

A still further object of our invention is to provide a general utility mixer which will be adapted for various types of mixing work in which different physical conditions of the ingredients are encountered, and in which the mixing apparatus may be inexpensively constructed and operated.

The above objects and other objects to which reference will be made in the ensuing description, we accomplish by that certain combination and arrangement of parts of which we have shown a preferred embodiment.

Referring to the drawings:—

Figure 1:
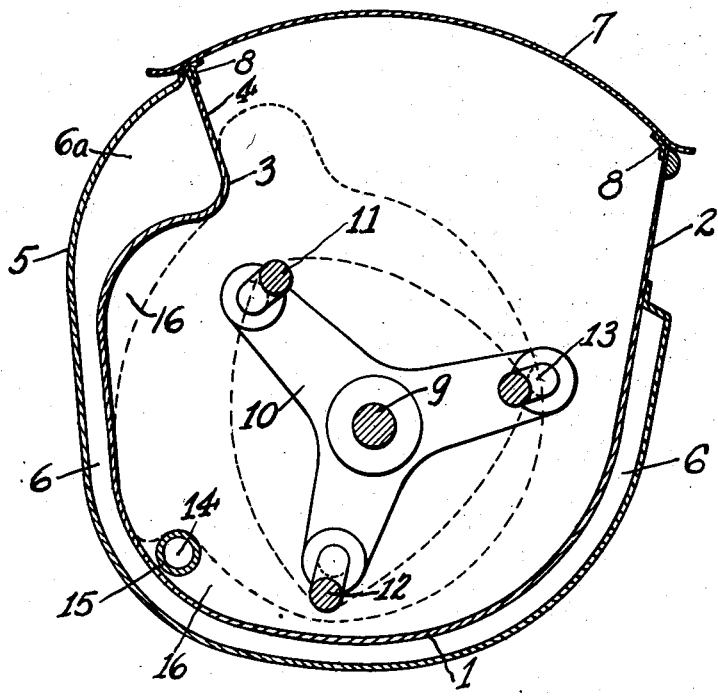
Figure 1 is a vertical sectional view of our new type of mixer.

In Figure 1 we have shown a mixing bowl having a U-shaped base wall 1, which continues upwardly on one side in a substantially straight wall 2, and is formed in an inwardly convex bent portion 3, from which the wall extends outwardly and upwardly, as indicated at 4. A jacket wall 5 is secured to the upwardly bent portion 4, and the wall 5 extends in the U-shaped formation around the base of the bowl forming the jacket compartment 6. The cover for the bowl is indicated at 7, having flange portions 8 which extend down into the bowl to prevent material from splashing out during the mixing operation. The bowl illustrated is preferably of the type which may be rocked on its axis to cause it to pour out the contents, during which operation the cover is preferably elevated so that the flange portions 8 will clear the side walls of the bowl during this operation. The end walls of the bowl will be the usual straight walls conforming in shape to the cross sectional shape of the side and bottom walls.

As disclosed in our Patent No. 1,651,092, we have shown an agitator having a central driving shaft 9, and with spiders 10 at the ends which support the agitator blades 11, 12 and 13, which, as disclosed in our patent, are of the type in which the contours of the blades or bars extend in different planes so as to avoid carrying of the dough mass.

The mixing machine illustrated in Figure 1 has the agitator rotated in a counterclockwise direction, and the path of travel of the dough mass is upwardly and outwardly from whichever bar is in the position indicated by the bar 11, in which position the centrifugal force affects the dough mass to cause it to be thrown upwardly, where it strikes the braking surface 3, to rise along the straight surface 4, from which the dough mass is caused to be projected downwardly against the side wall, where it is diverted away from the wall by a diverting roll 14, which is preferably freely rotatable on the shaft 15 and causes the dough to swing back to the agitator, forming, at certain stages of the mixing and kneading operation the air spaces 16 and 16a between the walls and the batch of dough. The wall portions diverging from the braking surface 3 leaves in the cooling jacket 6 (Fig. 1) an enlargement 6a, adapted to hold an especially large amount of the cooling medium next to these wall portions, with an ample cooling effect on the dough as it comes into intimate contact with the surfaces 3 and 4 as just described.

Figure 7:
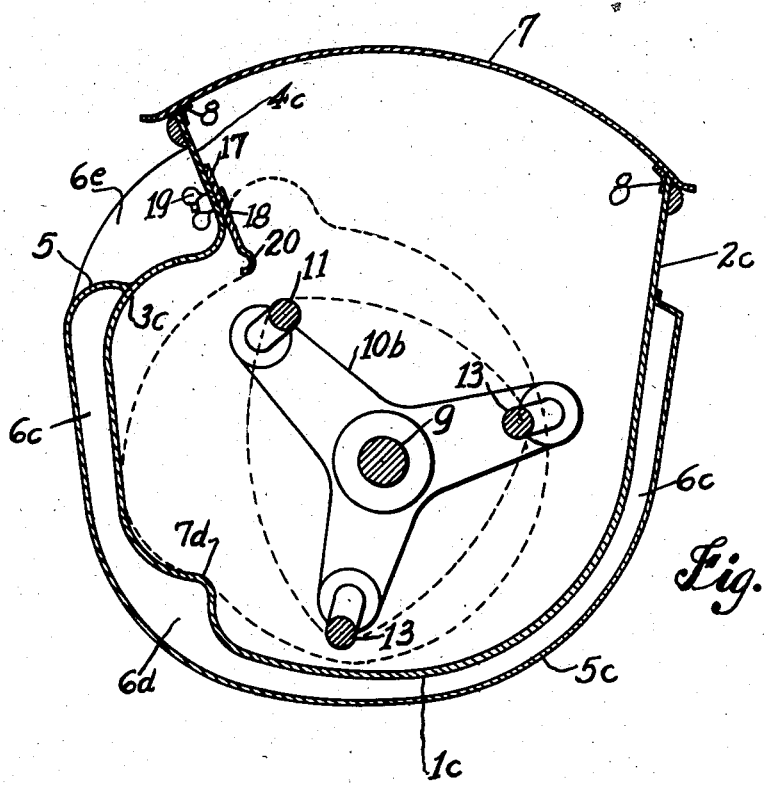
Figure 7 is a sectional elevation showing how the abutment is formed in the side of the bowl.

The cooling medium may be air, gas, water, brine, or other gaseous or liquid cooling agent; and we are not limited to any specific kind of coolant, nor to any specific disposition thereof. As shown in Figs. 1 and 7, the jacket 6 or 6c extends around the major portion of the bottom and sides of the bowl; and wherever the dough comes in contact with the bowl walls it becomes subject to the effect of the coolant. Also, where it tends to separate from the wall, as at 16 below the braking portion 3, air enters between the dough and the wall. The result is a fairly constant cooling effect on the dough throughout the kneading and mixing operation, overcoming the heating effect of friction within the dough and of the dough with the bowl and agitator surfaces.

Figure 2:
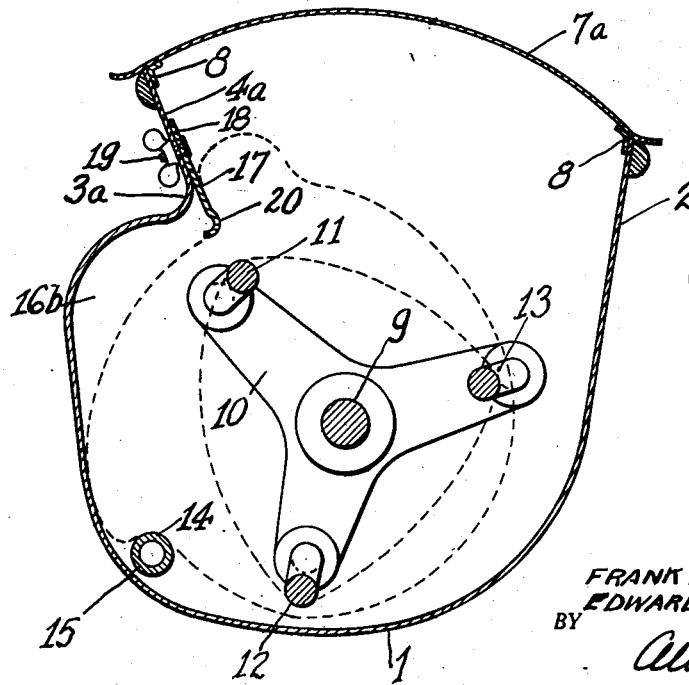
Figure 2 is a vertical sectional view of a modified type of mixer.
Figure 3:
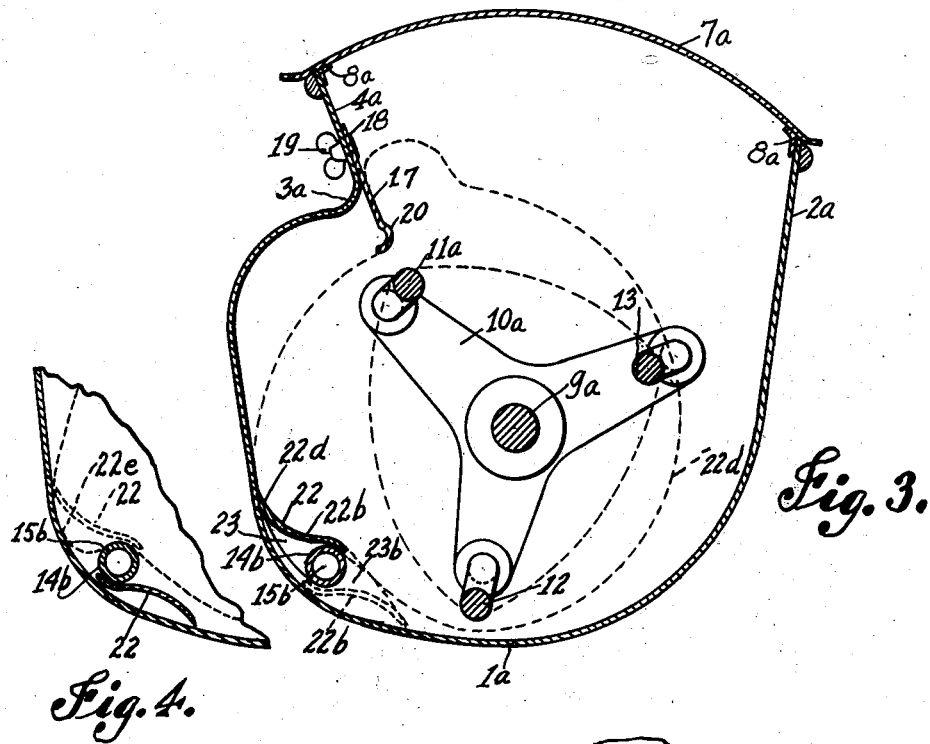
Figure 3 is a vertical sectional view of a mixer showing an abutment with baffle attached and in such position as to exclude the abutment member from mixing operation.
Figure 4:
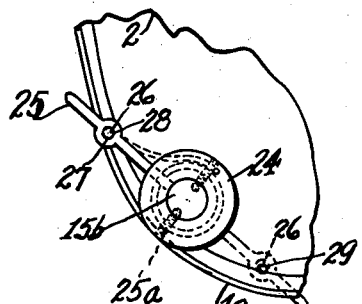
Figure 4 is a fragmentary sectional view showing the baffle turned to a position so that the abutment member is included in the mixing operation.
Figures 5, 6:
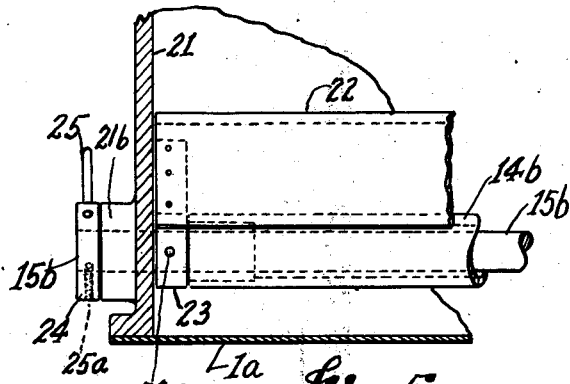
Figure 5 is a fragmentary sectional elevation of the abutment member and the means for attaching the baffle.
Figure 6 is a fragmentary end elevation showing the means for rotating the baffle.

The modification shown in Fig. 2 consists in providing a blade 17 having slots 18 with thumb nuts 19 on threaded studs extending through the wall 4a and the blade slots 18, with heads against the inner sides of the blade, so that the nuts 19 may clamp the blade 17 in differently elevated positions so that its lower convex edge 20 may be held at different distances from the path of the agitator blades 11, 12 and 13, according to the amount of braking effect desired. This adjustable blade 17 acts, in any given adjusted position, practically in the same manner as the braking surface 3 of Fig. 1, causing the dough mass brought against it to be folded and to move down to a position, under action of the agitator, where it is diverted back to the agitator by means of the roll 14 in the same manner as in the example of Fig. 1. In this example of Fig. 2 no cooling jacket is shown, but it will be understood that it may have such a provision, with slight modifications as a consequence of the provision of the adjusting nuts 19; and while the blade 17 in its more downwardly adjusted positions will not allow as intimate contact of the dough mass with the bowl wall below the blade 17, it will cause an ample air space 16b. Also, the adjustable mounting of this blade 17 may be varied with consequent permissible variations in the application of a coolant chamber similar to the enlargement 6a in Fig. 1.

The example of Figs. 3, 4, 5 and 6 is shown as similar to that of Fig. 2, although it will be understood that it may be similar to Fig. 1; the modification in this example consisting in the provision for rendering the lower diverting roll 14b, which rotates on the shaft 15b, either operative as in Figs. 1 and 2, or inoperative, with the intervention of a modified diversion of the dough back to the agitator as it comes down from the upper braking means or blade 17 in the manner before described. For controlling this operation, a baffle 22b is provided, to be thrown up over the roll 14b as shown by the solid lines in Fig. 3, or down under this roll 14b as shown by the dotted lines.

The shaft 15b extends out through the bowl wall 21, which has a boss 21b in which the shaft is rotatable. The baffle 22b has arms 23 embracing the shaft 15b and fixed thereto by pins 23a. The shaft 15b, on its end part out past the bearing or boss 21b has a hub 24 fixed on it by a set screw 25a. A handle 25 extends radially from this hub 24 and has an eye 26 (Fig. 6) through which a pin 27 may project into either one of two holes 28 and 29 in the side of the bowl, to hold the baffle 14b in either one of the two positions as above described. This baffle 22b is of flat S shape to curve convexly over the roll 14b with a concave extension out to the bowl wall, when the baffle is turned up over the roll; and to have a concave fit under the roll 14b and a convex upwardly presented extension from under the roll, facing the path of the agitator blades, when the baffle is turned down. It will be understood that the baffle 22b, by its arms 23, straddles the roll 14b longitudinally of the roll, leaving the roll 14b free to rotate on the shaft 15b when contracted by the dough mass upon being exposed as the baffle is turned down, while the shaft 15b is free to rotate when the pin 27 is withdrawn from the hole 28 or 29, for turning the baffle up or down.

In Fig. 7 the machine is like that of Fig. 2, except that instead of the roll 14 rotating on the shaft 15, the bowl wall 1c has an indentation transversely of the path of travel of the dough mass, forming a diverting surface 7b; this formation being similar to the fixed braking device of Fig. 1 in that walls of the bowl diverge outwardly from the path of travel of the agitator blades. Thus a lower inwardly diverting surface is formed which acts like the baffle 22b when it is turned up and excludes the roll 14b in Figs. 3, 4, 5 and 6. Thus the comparison of the example of Figs. 1 and 2, the example of Figs. 3, 4, 5 and 6, and the present example of Fig. 7, is that in the first the lower diverting roll 14 always is exposed, in the second the roll 14b may be exposed, with a rolling action as the dough passes it, or else covered, with a stationary diverting surface formed by the covering baffle 22b, and in the third there is always a stationary diverting surface 7b similar to that formed by the covering baffle 22b in the second example. With this fixed diverting surface the coolant may come into close proximity to it, as in the enlargement 6d afforded by the formation of this surface, in the coolant jacket 6c in Fig. 7. This is similar to the advantage attained with the upper braking surface 3 in Fig. 1, with the enlarged space 6a for coolant.

The chief advantage of the upper abutment or braking surface 3 of Fig. 1, or the adjustable brake blade 17 of Fig. 2, is the ability of a straight walled device of this kind to deflect the dough without the tendency to tear the same, which is the case when a bar, roller or the like is used, on account of the wrapping of the dough around such a device which has a space above and outward from it between it and the inner wall of the bowl. This is most liable to happen when the dough is thrown up a considerable distance toward the top and back of the bowl, over such a device. Such wrapping and tearing action is avoided by our invention, presenting a surface like the part 4 in Fig. 1, or like the blade 17 in Fig. 2, with no space into which the dough may protrude; but from which the dough must of necessity curl smoothly back to pass smoothly down under the braking surface, where there is no tendency for wrapping and tearing.

These same advantages attend the use of the baffle 22b over the lower roll 14b, or the use of the permanently continuous diverting surface 17b in Fig. 7.

The choice of use of the roll 14b, exposed, or the use of the baffle 22b or the surface 17b, is dictated largely by the nature of the dough being kneaded and mixed. Special doughs containing raisins, fruit and the like do not have the tenacity of the ordinary wheat flour dough, and therefore have a greater tendency to wrap and clog behind the roll, either such as has been used in prior mixers above as a braking means, or as used in Figs. 1 and 2 herein as a diverting roll. But if the ordinary more tenacious doughs are being worked, the function of the roll, especially as a diverting device in the lower part of the bowl, to more effectively retard and divert such dough, which is permissible without clogging, wrapping and tearing, may be made available, in Fig. 2, by swinging the baffle 22b from over the roll 14b. While a device is shown for swinging this baffle 14b from outside the bowl, it will be understood that means may be provided for manipulating or adjusting the baffle inside the bowl; and this applies also to the means for adjusting the blade or brake 17 in Fig. 2. In Fig. 7, where there is such an adjustable blade or baffle 17, and also a coolant jacket not provided in Fig. 2, the part 6e of the jacket is recessed to permit access to the nut 19 for adjustment of the blade or baffle 17.

A number of examples, with various combinations of the several novel features of our invention, are disclosed herein, and these are rather specifically illustrated and described. However, it will be understood that other variations in the shape, arrangement and mode of movement or action of parts may occur in practice, and that we are not limited to such precise disclosure, but what we claim as new and desire to secure by Letters Patent is:

1. A mixing machine comprising an agitator moving in an endless path, a bowl containing said agitator, and elements in said bowl having a junction near said path and extending in diverse directions outward from said junction, one of said elements being adjustable on the other element inward toward and outward away from said path.

2. A mixing machine comprising an agitator moving in an endless path, a bowl containing an agitator, and elements in said bowl having a junction near said path and extending in diverse directions outward from said junction, one of said elements being adjustable on the other element inward toward said path and outward away from said path, and having a convex surface next to said path.

3. A mixing machine comprising an agitator moving in an endles path, a bowl containing said agitator, and an abutment in said bowl outward from and near said path, having an outward continuation adapted to prevent outer protions of material moved by said agitator against said abutment from wrapping around the abutment.

4. A mixing machine comprising an agitator moving in an endless path, a bowl containing said agitator, and an abutment in said bowl outward from and adjustable more or less closely to said path, and having a continuation outwardly, adapted to prevent outer portions of material moved by said agitator against said abutment from wrapping around the abutment.

5. A mixing machine comprising an agitator moving in an endless path, a bowl containing said agitator, a roller near an interior wall of said bowl on an axis transverse to said path, and a deflecting cover for said roller extending from a position between said roller and said path out past said roller at its side facing oppositely to the direction of advance of said agitator, and movable out of said position.

6. A mixing machine comprising an agitator moving in an endless path, a bowl containing said agitator, a roller near an interior wall of said bowl on an axis transverse to said path, and a deflecting cover for said roller extending from a position between said roller and said path out past said roller at its side facing oppositely to the direction of advance of said agitator, and pivoted to swing toward the opposite side of said roller, leaving said roller exposed at its first mentioned side.

7. A mixing machine comprising an agitator moving in an endless path and acting upon material around said path, a bowl containing said agitator, and means adjustably mounted in said bowl to be positioned more or less closely adjacent to said path for momentarily retarding material thrown outward from said path and comprising a surface against which the outer portion of said thrown-out material abuts when retarded, preventing wrapping of said outer portion of the material around the retarding means so as to avoid tearing thereof as the material is withdrawn after its momentary diversion.

8. A mixing machine comprising an agitator and a bowl containing said agitator, having effective wall surfaces extended in toward the path of action of said agitator and outward away from said path, a roller succeeding said wall surfaces in the direction of action of said agitator, on an axis transverse to said path, and means adjustable to slant inward across said roller toward said path in the direction of said action, or to extend beyond said roller in said direction, out from between said roller and said path.

9. In a mixing machine comprising a bowl and an agitator moving in said bowl, a baffle in said bowl adjacent to the path of said agitator, defining successive paths traveled by material carried with and thrown out by said agitator, said baffle having an area facing across a major outer portion of the path of approach of the material to the baffle, to force the material inward in an intact mass as it passes said baffle to the next path, and means for varying the extent of said area.

10. In a mixing machine comprising a bowl and an agitator moving said bowl, said bowl having parts of its walls diverging outwardly from a junction adjacent to the path of said agitator, defining successive paths traveled by material carried with and thrown out by said agitator, one wall part having an area forming a baffle facing across a major outer portion of the path of approach of the material to said wall part, said bowl having a space exteriorly, between the diverging wall parts, and means for confining a cooling medium in said space.

11. In a mixing machine comprising a bowl and an agitator moving in said bowl, said bowl having a wall portion extended inward toward the path of the agitator and forming a baffle in the path of material carried by and thrown out from said agitator, and forming a corresponding hollow portion in the exterior of said bowl adjacent to the baffle, and means for confining a cooling medium in said hollow portion.

12. A mixing machine comprising an agitator moving in an endless path, and a bowl containing said agitator, a portion of the wall of said bowl being projected inwardly at such a location and in such form as to constitute an abutment in said bowl outward from and near said path, having an outward continuation adapted to prevent outer portions of material moved by said agitator against said abutment from wrapping around the abutment.

13. A mixing machine comprising an agitator moving in an endless path, and a bowl containing said agitator, said bowl having a wall formed of relatively thin material, a portion of which is so formed inwardly and so located as to constitute an abutment in said bowl outward from and near said path, having an outward continuation adapted to prevent outer portions of material moved by said agitator against said abutment from wrapping around the abutment.

FRANK X. LAUTERBUR.
EDWARD J. LAUTERBUR.